United States Patent

Fagerdahl et al.

[11] Patent Number: 5,852,241
[45] Date of Patent: Dec. 22, 1998

[54] METHOD AND DEVICE FOR FEEDING COMPONENTS FOR BONE CEMENT INTO A MIXING VESSEL FOR THESE

[75] Inventors: Sten Fagerdahl, Orebro; Lars-Erik Skagerlund, Karlskoga, both of Sweden

[73] Assignees: Josam Lastbiltenik AB; Optab Optronikinnovation, both of Sweden

[21] Appl. No.: 702,727

[22] PCT Filed: Apr. 18, 1995

[86] PCT No.: PCT/SE95/00415

§ 371 Date: Sep. 9, 1996

§ 102(e) Date: Sep. 9, 1996

[87] PCT Pub. No.: WO95/29378

PCT Pub. Date: Nov. 2, 1995

[30] Foreign Application Priority Data

May 10, 1993 [SE] Sweden ................................. 9301599

[51] Int. Cl.[6] ............................................... G01P 15/00
[52] U.S. Cl. ........................................... 73/487; 356/155
[58] Field of Search ....................... 33/228, 193, 203.18, 33/203.19, 288; 356/155, 139.09; 364/425; 73/487

[56] References Cited

U.S. PATENT DOCUMENTS

| 4,097,157 | 6/1978 | Lill ......................................... 356/152 |
| 4,143,970 | 3/1979 | Lill ......................................... 356/155 |
| 4,150,897 | 4/1979 | Roberts, Jr. et al. .................... 356/152 |
| 4,154,531 | 5/1979 | Roberts, Jr. et al. .................... 356/152 |
| 4,159,574 | 7/1979 | Samuelsson et al. ..................... 33/228 |
| 4,249,824 | 2/1981 | Wiederrich et al. .................... 356/155 |
| 4,823,470 | 4/1989 | Hörvallius ................................ 33/228 |

FOREIGN PATENT DOCUMENTS

| 0386401 | 9/1990 | European Pat. Off. ...... G01B 11/275 |
| 2160970 | 1/1986 | United Kingdom . |
| 92/19932 | 11/1992 | WIPO .......................... G01B 11/275 |

Primary Examiner—Hezron Williams
Assistant Examiner—Richard A. Moller
Attorney, Agent, or Firm—Hayes, Soloway, Hennessey, Grossman & Hage, P.C.

[57] ABSTRACT

The present invention relates to a measurement system for measuring wheel angles and determining the position of chassis units on a vehicle. The measurement system includes a measuring unit which can be mounted on a vehicle and arranged to measure angles and distances in the horizontal plane with reference to the longitudinal axis of the vehicle, and in the vertical plane with reference to the vertical direction. The results of measurement are fed to a control unit, connected to the measuring unit by a lead. A computer which compiles and computes the measurement results, and provides information on the vehicle wheel alignment angles and the positions of vehicle chassis units by means of a display monitor or a printer connected to the control unit.

12 Claims, 4 Drawing Sheets

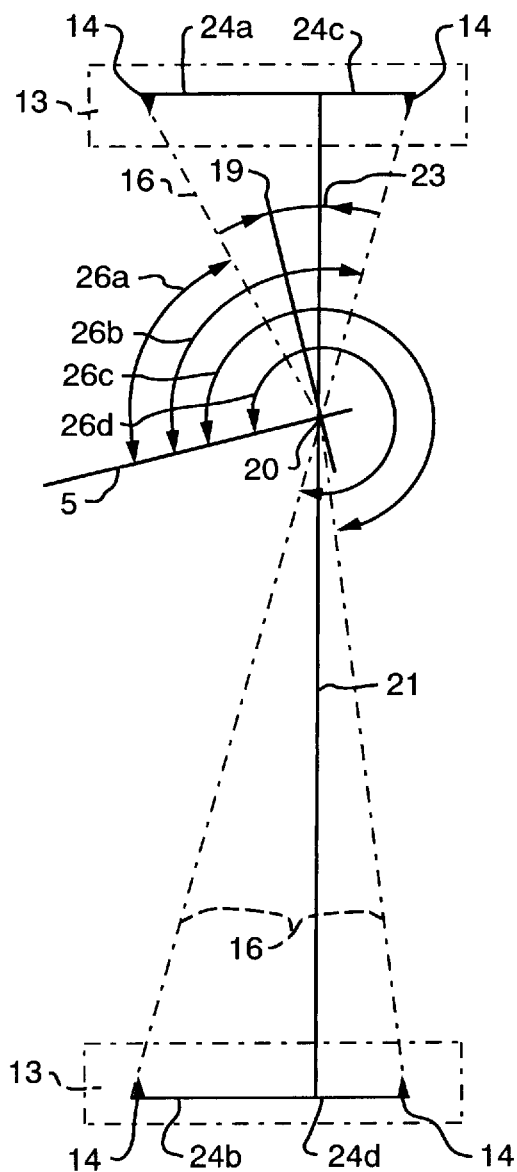
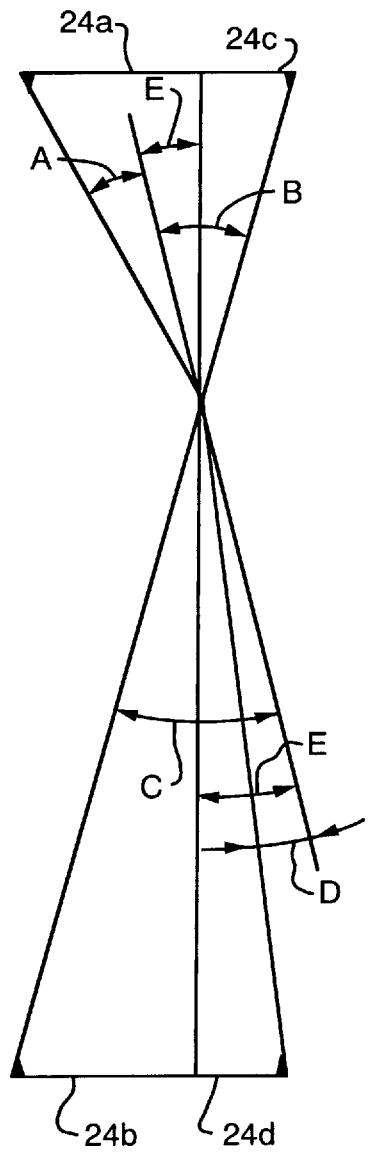
FIG. 2A
FIG. 2B

METHOD AND DEVICE FOR FEEDING COMPONENTS FOR BONE CEMENT INTO A MIXING VESSEL FOR THESE

BACKGROUND OF THE INVENTION

1. Field of the Invention

The present invention relates to a system for measuring wheel alignment angles on vehicles and determining the positions of vehicle chassis units. The values of the angles formed by the rotational axes of the wheels with each other, as well as with the longitudinal axis of the vehicle and the road surface, must be fixed to ensure that the steering characteristics of the vehicle are satisfactory and that tire wear is minimized. Furthermore, in the case of steering front wheels, these angles shall be altered in a specific manner when the wheels are steered in a direction other than their normal direction of rolling. This is achieved, firstly, by the fact that the king pins about which the wheels pivot when turned are aligned at a fixed angle to the road surface and, secondly, that the steering arms through which the movements of the steering wheel are transferred to the road wheels form fixed angles with the direction of rolling of the wheels. The permissible deviations from the ideal values are so small that control measurement must be carried out at regular intervals and the wheel alignment adjusted as required, particularly if the vehicle has been subjected to abnormal stresses.

The vertical direction is normally used as reference when measuring wheel alignment angles in the vertical plane. No similar natural reference is available when carrying out measurements in the horizontal plane. In the case of light vehicles, such as cars, wheel angle measurements may be referred to the mean direction of travel of the rear wheels, and many methods and devices for this purpose have been developed over the years.

2. Description of the Prior Art

In the case of heavy vehicles, the longitudinal axis of the vehicle should instead be used as reference. Swedish patent No. 7316572-2 deals with a system of measurement in which a reference of this type is used. In this procedure, two lateral gauge rods, provided with lateral measurement scales at their respective ends, are attached to the vehicle at the front and rear in such manner that the zero points of the scales are at the same distance from the longitudinal axis of the vehicle a holder provided with a journal is attached to each wheel, with the journal aligned parallel to the axis of rotation of the wheel. The optical extensions of the lines of collimation with the respective measurement scales in both directions can be compared with each other to determine the positions of the points relative to the longitudinal axis of the vehicle. The measured values can be used to determine the direction of rolling of the wheels and the required wheel angles, for which purpose the distance, on each side of the vehicle, between the sighting device and the scales must be known.

To ensure high accuracy of measurement, a wheel alignment measurement procedure of this type must be carried out in a careful and meticulous manner, which can be time-consuming and may also be subject to error due to the human factor. Thus, if the distances between the measurement scales is long, they (the scales) may be difficult to read from the sighting device. With the aim of simplifying the measurement procedure, Swedish patent No. 9191303-7 describes a refinement of the aforementioned system in which a holder provided with a journal parallel to the axis of rotation is attached in a known manner to each individual wheel or pair of wheels. A radiation source, such as a laser projector, which is arranged at the side of the vehicle in a plane common to its longitudinal axis to alternately illuminate at least two lateral measurement scales in or at each respective end of the vehicle, is mounted on the said journal. In this context, each measurement scale consists of an opto electronic detector unit incorporating a number of photocells and at least one microprocessor, which computes the measured values and supplies information on the exact position of the incident light beam on the scale. However, a system of this type employing photosensitive measurement scales is designed only for measuring horizontal wheel alignment angles on the vehicle.

A number of methods of measuring wheel alignment angles in the vertical plane such as camber (inclination of the wheel from the vertical) caster (front axle inclination) and king-pin inclination (KPI), as well as of measuring the maximum lock-to-lock angle and toe-out on turns (Ackermann angle) of the wheels, are already known. Measurements of this type often require the use of measuring instruments of various types, and of scales which must be read visually, calling for considerable personal involvement and a high degree of accuracy.

SUMMARY OF THE INVENTION

The present invention is based on the abovementioned known methods and relates to a measurement system which, by simple integration of devices for measuring angles with respect, firstly, to the longitudinal axis of a vehicle and, secondly to the vertical, units complete measurement of all of the wheel alignment angles on a vehicle to be carried out using one and the same set of equipment. The purpose of the measurement system in accordance with the invention is to enable the aforementioned measurement procedures to be automated and also to permit measurement of the wheel angles with the wheels turned to random angular positions, which is a clear advantage, for example, when measuring king-pin inclination.

The measurement system in accordance with the present invention comprises at least one measuring unit, which can be mounted on the vehicle to measure the wheel angles and to determine the chassis unit positions, which invention is mainly characterised in that the measuring unit incorporates measuring devices for measuring angles and distances in the horizontal plane to preselected, sensitised marks on the vehicle with reference to the longitudinal axis of the vehicle.

In a preferred embodiment of the measurement system in accordance with the invention, the measuring unit is mounted on a journal in a holder which can be mounted on the outside of a vehicle wheel with the journal parallel to the axis of rotation of the wheel, the invention being characterised in that the measuring unit incorporates a radiation source designed to emit a thin, parallel beam, a drive device which imparts a sweeping rotary movement in the horizontal plane towards and past the sensitised marks on the vehicle, an angle measuring device connected to the drive device and adjusted to detect the rotary movements of the beam, and a detector unit which senses changes in amount of light reflected from the marks and transmits a signal indicating the instantaneous angular direction of the beam. Based on this, the computer in the control unit can compute the direction of rolling of the wheel relative to the longitudinal axis of the vehicle.

In the measurement system in accordance with the present invention, the radiation source consists of a laser diode, and a preferred embodiment includes gauge rods provided with lateral measurement scales attached to each respective end of the vehicle at the same distance from the its (the vehicle's) longitudinal axis, the measurement scales being provided with sensitised marks consisting of light-reflective spots, bands or lines.

The invention is, furthermore, characterised in that the measuring unit incorporates a clinometer which, in a known manner, detects the positions of chassis units in the vertical plane using the vertical as reference, and that horizontal and vertical measurements interact in the computation and determination of all of the vehicle wheel alignment angles.

Other distinguishing characteristics of the invention are described in the attached patent claims and the following description of an embodiment of the measurement system which exemplifies the invention.

BRIEF DESCRIPTION OF THE DRAWINGS

The description is based an the following drawings, of which

FIGS. 2a and 2b illustrate geometrically a required wheel angle relative to the longitudinal axis of the vehicle;

DESCRIPTION OF THE PREFERRED EMBODIMENT

Figure 1:
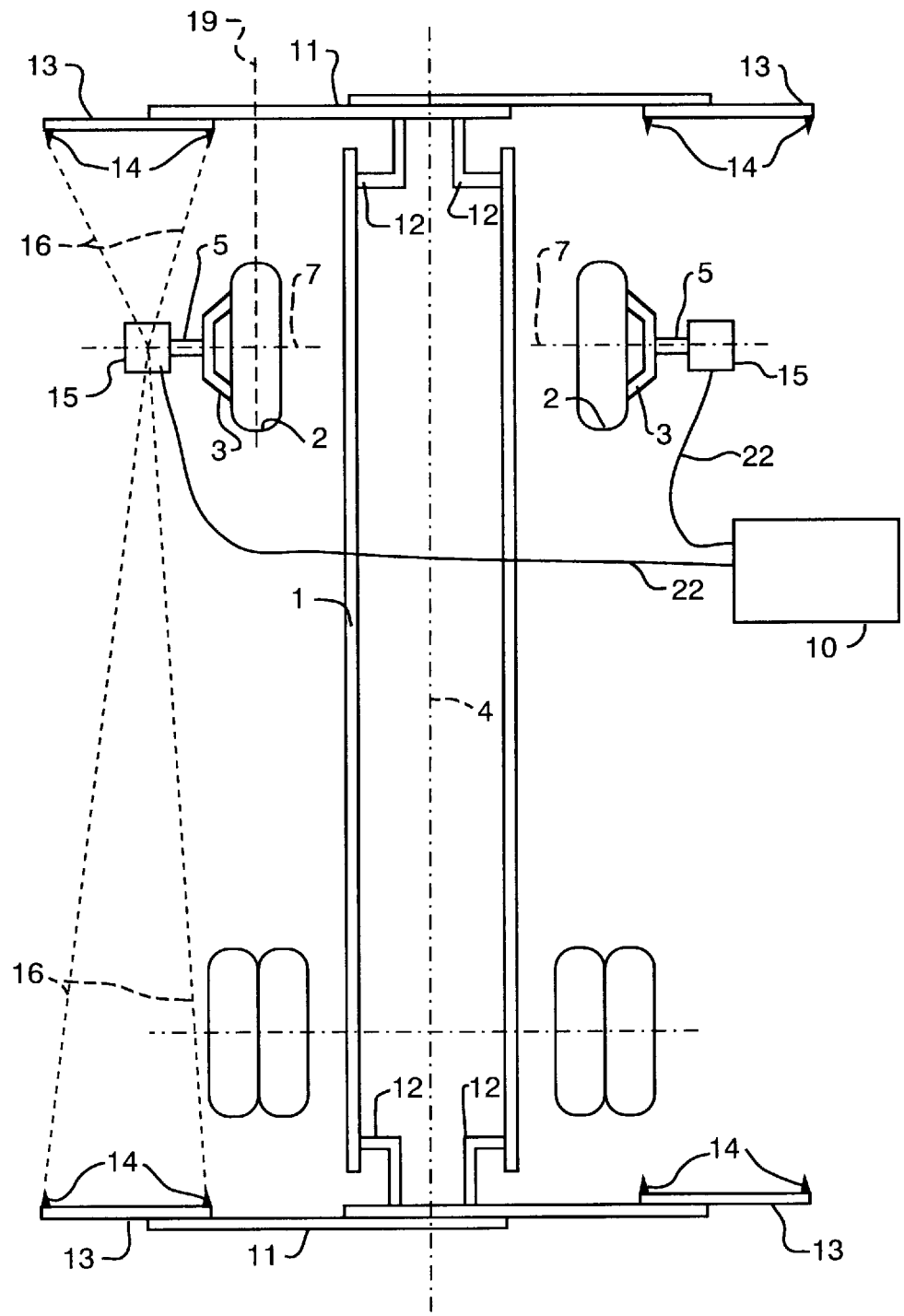
FIG. 1 shows, in simplified form, a vehicle fitted with gauge rods and measurement scales at each respective end of the vehicle, and with measuring units attached to the front wheels of the vehicle.

FIG. 1 shows a vehicle frame 1, to each end of which are attached lateral gauge rods 11 provided with measurement scales 13. Attachment devices 12 for the gauge rods 11 ensure that the distance between the measurement scales 13 and the vehicle frame 1 and thereby, between the measurement scales 13 and the longitudinal axis 4 of the vehicle, is the same in the case of all measurement scales 13. Holders 3 are attached to vehicle wheels 2. Holders 3 of this type are shown mounted on both front wheels of the vehicle in FIG. 1. These holders 3 shall be adjusted so that their projecting journals 5 are parallel to the axis of rotation 7 of each respective wheel. Measuring units 15 in accordance with the invention are mounted on the journals 5. In FIG. 1, measuring units 15 are shown mounted only on the two front wheels 2. Alternatively, several wheels may be provided with a measuring unit 15. Similarly, it is possible to use only a single measuring unit 15 of this type, provided that it is moved from wheel to wheel according as the angles are measured.

The measurement scales 13 are provided with sensitised points 14 and the measuring units 15 incorporate measuring devices for measuring the angles between, on the one hand, the lines of collimation 16 and the sensitised points 14 and, on the other hand, between the lines of collimation 16 and the axis of rotation 7 of the wheel. A sensitised point is defined as a small object with characteristics which enable it to be identified unambiguously by the measuring unit 15. The points 14 are arranged in groups, each consisting of at least two points. This is achieved by providing each of the measurement scales 13 with at least two such sensitised points 14. A given point in a given group and its equivalents in the other groups shall, on one and the same side of the vehicle, be located at the same distance from the longitudinal axis 4 of the vehicle or other line selected as reference for measuring the wheel alignment angles. This means that a line through the points which correspond to each other shall be parallel to the said reference line. The groups of points shall be located at different distances from the measuring unit 15. This may preferably be achieved by positioning one measurement scale 13 at the front end and one at the rear end of the vehicle. The measuring devices in the measuring unit 15 are adjusted to permit measurement to be carried out using all points 14 on one and the same side of the vehicle.

In FIG. 2a, point 20 represents the location of the measuring unit 15 on the journal 5. A line 21 through this point is parallel to the longitudinal axis 4 of the vehicle and serves as reference for angle measurement. The angle 23 between the line 21 and the direction of travel 19 of the wheel is the wheel angle which it is desired to measure. The positions of the sensitised points 14 on the measurement scales 13 are such that the pairs of distances between them and the reference line 21 are equal; in other words, distance 24a is equal to distance 24b, and distance 24c is equal to distance 24d. Using the journal 5 on the holder as reference, the measuring unit 15 measures the alignment angles 26a, 26b, 26c and 26d between the journal and the sensitised points 14. The journal 5 is perpendicular to the direction of travel 19 of the wheel.

The angles denoted A, B, C and D in FIG. 2b represent the differences between the angles 26a, 26b, 26c and 26d, on the one hand, and multiples of an angle of 90 degrees on the other. The angle E in FIG. 2b is the required wheel angle. Since distance 24a is equal to distance 24b and distance 24c is equal to distance 24d, the following relationship applies:

$$\frac{\tan(A + E)}{\tan(CE)} = \frac{\tan(B - E)}{\tan(E - D)}$$

This relationship is in the form of an equation from which the angle E, as the only unknown quantity, can be calculated.

Figure 3:
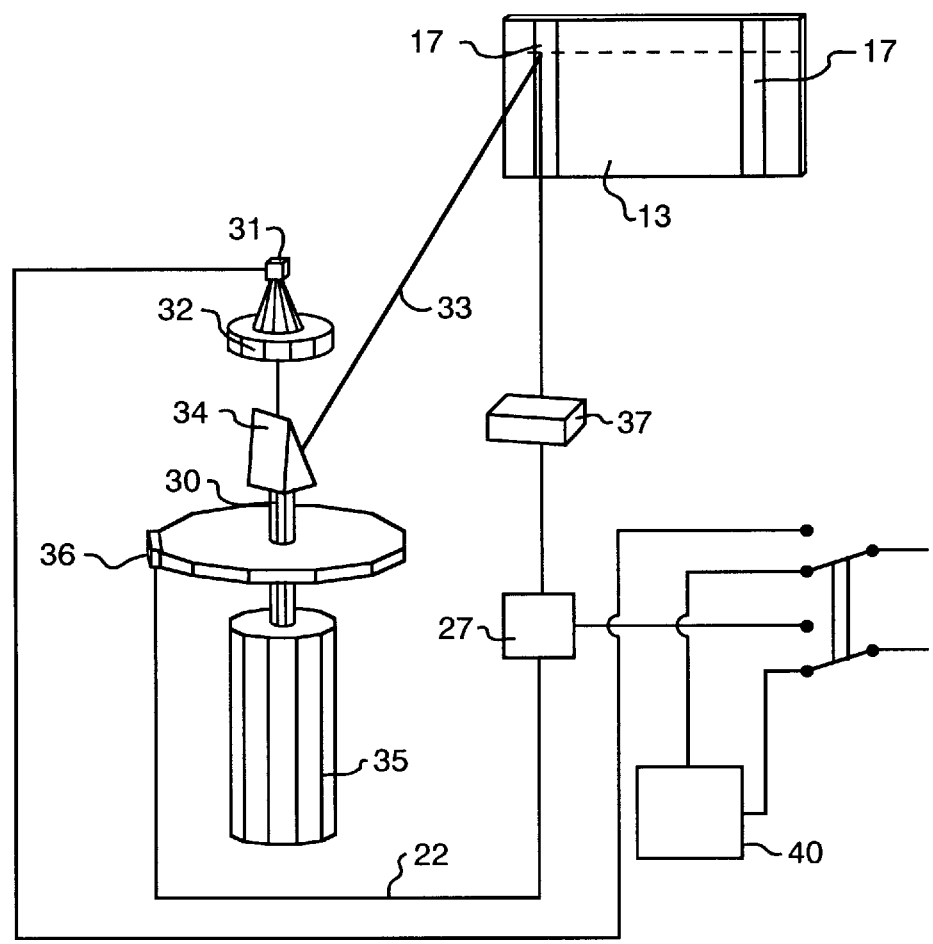
FIG. 3 shows the basic design of the unit for measuring angles.

FIG. 3 shows the basic design of the measuring unit 15 for optical measurement of the angles using sensitised marks in the form of bands on the measurement scales 13. A radiation source in the measuring unit 15 consisting, for example, of a laser diode 31 and a collimating lens 32, is arranged to emit a thin beam 33 in the vertical direction, which beam 33 is reflected through 90 degrees into an approximately horizontal direction by a small mirror 34 mounted on the shaft 30 of a motor 35. The motor 35 is designed to rotate at high speed, causing the mirror 34 to impart a sweeping, rotary movement to the beam 33 in the horizontal plane.

The motor shaft 30 also carries an angle sensor 36, which continuously transmits signals indicating the instantaneous angular position of the shaft. The angle sensor 36 is mounted at a specified angle relative to the journal 5 on the holder 3. Signals from the angle sensor 36 are transmitted to a control unit 10 connected to the measuring unit 15 by a lead 22, subject to the delivery of signals by a detector unit 37 in the measuring unit 15.

As the motor shaft 30 rotates, the outgoing beam 33 sweeps around in a horizontal plane oriented in such manner that the beam passes both measurement scales 13, one of which is shown in FIG. 3. Instead of points or lines, each measurement scale 13 may be provided with two retroreflective bands 17. A retroreflector is defined as a device which reflects incident light at in angle coincident with the angle of incidence. The points at which a light beam 33 passes the first edge of a band 17 in the direction of rotation is the equivalent of an aforementioned point 14. When a light beam 33 passes a band 17, the light from the beam 33 is reflected back to the measuring unit 15, in which it is received by the detector unit 37. The detector unit incorporates, a collecting lens and photoelectric detectors, which generate and transmit voltage pulses to an electronic circuit board and amplifier for further transmission to the control unit 10. The angle sensor 36 simultaneously transmits a signal to the control unit 10 describing the instantaneous angular position of the motor shaft 35. Alternatively, the detector unit 37 may be arranged to control a gate function 27, which controls the communication between the angle sensor 36 in the measuring unit 15 and the control unit 10. The control unit 10 incorporates a computer which, on the basis of the incoming signals and a preprogrammed computer program, computes the angular position of the journal 5 relative to the longitudinal axis 4 of the vehicle.

The embodiment of a device for performing measurements in the horizontal plane described and illustrated herein is only an exemplification of the invention concept, and the invention is not restricted to this embodiment. Thus, the two pairs of sensitised points 14 on each respective side of the vehicle may both be positioned at one and the same side of the wheel, that is either in front or behind the wheel but at different distances from it. Similarly, it is not necessary that the sensitised points 14 be located on measurement scales 13 attached to a vehicle. The measurement scales 13 may also be permanently installed in the vehicle's place of storage provided, in that event, that the vehicle is lined up in relation to the sensitised marks. Each measurement scale 13 may also be provided with more than two sensitised points or lines 14' for example to provide redundancy and, thereby, improve the accuracy of measurement.

To achieve a rotary, sweeping movement of the beam 33 using the exemplified version of the measuring unit 15, the radiation source and associated collimation optics may be mounted on the motor shaft 30 so that light is emitted in a direction perpendicular to the motor shaft 30 and may preferably be supplied with power across slip rings. Similarly, an accurate angle sensor may be provided by designing the motor 35 to run at a constant speed and determining the angle by time measurement relative to signal pulses from a sensor which delivers the said pulses at a specific angular position during each revolution of the shaft.

For vertical measurements, the measuring unit 15 incorporates an inherently conventional clinometer 40, which is designed to detect positions and angles of inclination in the vertical plane of chassis units and/or similar elements, using the vertical direction as reference. A clinometer of this type may, for example, consist of two housing halves in the form of cylindrical discs, made of an electrically insulating material and separated by an insulating ring so as to form an enclosed, annular space. This space is approximately half-filled with a non-conducting liquid with a high dielectric constant. Metallic foil elements on the inside of each housing half form the plates of two mirror-image condensers.

The clinometer is equipped with electronic circuits to permit comparative measurement of the capacitance of the condensers. The capacitance is a function of the proportion of the respective plates covered by the liquid, the level of which is determined by the inclination of the clinometer from the vertical. Output signals from the clinometer are fed to the computer unit in the control unit 10, which is connected to the measuring unit 15 by a lead.

However, positional changes in the vertical plane relative to the vertical direction may be detected in many different ways, assuming that the clinometer is incorporated in the measuring unit 15, where it interacts with horizontal measurement devices. In the 7 measurement system in accordance with the invention, interaction of this nature occurs, for example, when measuring caster, camber and KPI on the vehicle. Caster and KPI measurements are both carried out to determine the king pin settings in a vehicle, caster in the longitudinal and KPI in the lateral direction. However, since it is difficult to determine the king pin settings with respect to a reference plane when the wheels are pointing straight ahead, caster and KPI must be measured in another way. Camber is an angle which describes the inclination of the wheel from the vertical with the wheels pointing straight ahead. By comparing the camber angle with the corresponding vertical angles measured with the wheels turned to at least two different angular positions, it is possible to calculate the values of caster and KPI using the computer in the control unit 10.

Figure 4:
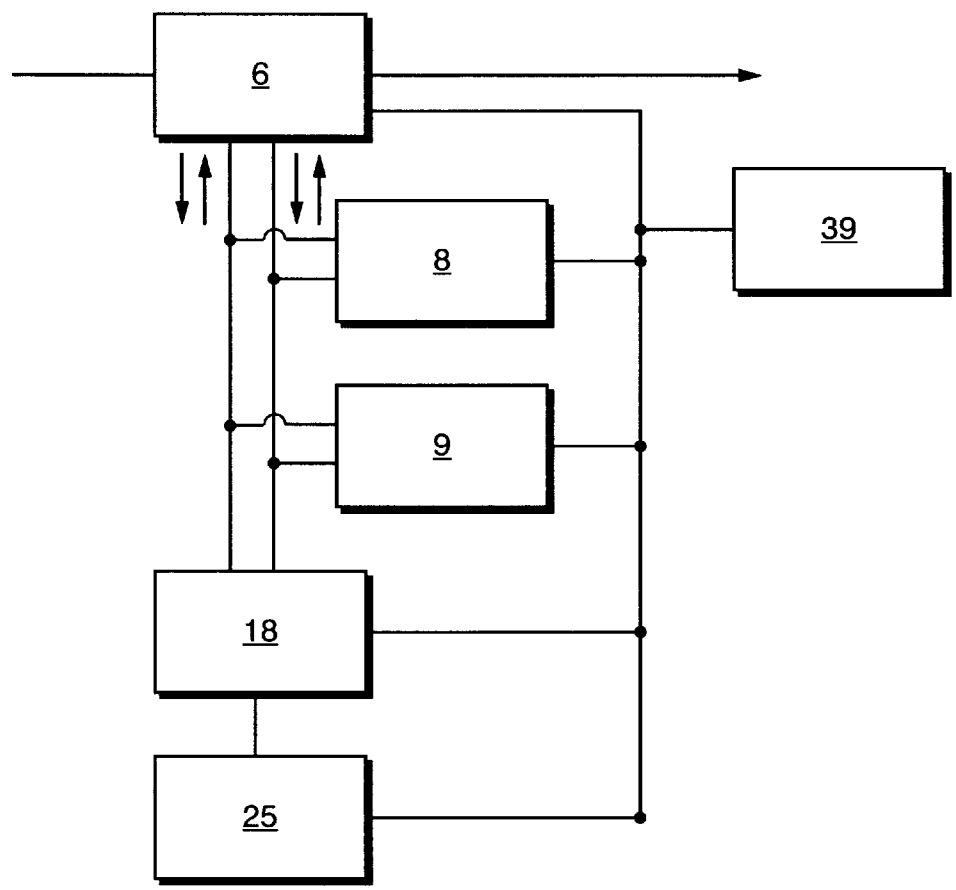
FIG. 4 is a block diagram showing the principal components of a control unit connected to the measuring unit.

With reference to FIG. 4, the computer may be regarded as consisting of a processor 6, a number of program memories 8 and working memories 9, and a number of electronic circuits 18 for intercommunication between the computer and a monitor 25 of the liquid crystal display (LCD) type, which can display results in text and figures, in the control unit 10.

A program memory 8 is preprogrammed with a specified computer program under which the measurement system is designed to operate, while measurement results are stored in a working memory 9, which enables the results to be displayed and printed out at any time.

To permit manual control of measurement functions and selection of preselected measurement programs, the control unit 10 is provided with a keypad which enables measurement functions to be selected as required. The control unit 10 is, furthermore, designed to interact with a conventional printed for printing outmeasurement results. These results remain stored in the control unit computer when the measuring unit 15 is disconnected from the control unit 10.

The measuring unit 15 and control unit 10, and their electronic components, are supplied with power either by connection to the ordinary power supply or by means of a battery unit 39 in the control unit 10.

The present invention is not intended solely for measuring wheel alignment angles and determining the positions of chassis units in the vehicle, but may also be used to measure and check the condition of individual chassis elements and body units which have been exposed to abnormal stresses, as well an alignment aid when straightening a vehicle frame.

We claim:

1. Apparatus for measuring wheel alignment angles of a wheeled vehicle in relation to the longitudinal axis of such vehicle, said apparatus comprising at least one measuring unit for mounting to the outside of a vehicle wheel, said measuring unit including a radiation source for emitting a thin, parallel beam towards a target mounted adjacent a respective end of said vehicle, said target having a plurality of sensitized marks, a drive device for imparting to the beam a rotary, sweeping movement in the horizontal plane, an angle measuring device connected to the drive device and arranged to sense rotary movement of the beam, and a detection unit for detecting changes in the amount of light reflected from the sensitized marks and for generating signals representative of the instantaneous angular position of the beam with reference to the longitudinal axis of the vehicle.

2. Apparatus according to claim 1, wherein the radiation source consists of a laser diode.

3. Apparatus according to claim 2, wherein said target comprises at least two groups of sensitized marks, each group consisting of at least two marks positioned such that each has a corresponding mark in every other group, and a straight line drawn between corresponding marks runs parallel to the longitudinal axis of the vehicle.

4. Apparatus according to claim 3, and comprising a target mounted adjacent each corner end of said vehicle, each of said targets comprising the sensitized marks consisting of light-reflective spots or lines which form lateral measurement scales and wherein each of said targets is mounted at the same distance from the longitudinal axis of the vehicle.

5. Apparatus according to claim 3, and comprising a target mounted adjacent each corner end of said vehicle, each of said targets comprising sensitized marks consisting of at least two retroreflective bands which form lateral measurement scales and wherein each of said targets is mounted at the same distance from the longitudinal axis of the vehicle.

6. Apparatus according to claim 5, wherein the detection unit in said at least one measuring unit is arranged to deliver a signal to a control unit which incorporates a computer for compiling and estimating the measuring results for providing relative information on the measuring results for the vehicle.

7. Apparatus according to claim 1, wherein said target comprises at least two groups of sensitized marks, each group consisting of at least two marks positioned such that each has a corresponding mark in every other group, and a straight line drawn between corresponding marks runs parallel to the longitudinal axis of the vehicle.

8. Apparatus according to claim 7, and comprising a target mounted adjacent each corner end of said vehicle, each of said targets comprising sensitized marks consisting of light-reflective spots or lines which form lateral measurement scales, and wherein each of said targets is mounted at the same distance from the longitudinal axis of the vehicle.

9. Apparatus according to claim 7, and comprising a target mounted adjacent each corner end of said vehicle, each of said targets comprising sensitized marks consisting of at least two retroreflective bands which form lateral measurement scales, and wherein each of said targets is mounted at the same distance from the longitudinal axis of the vehicle.

10. Apparatus according to claim 9, wherein the detection unit in said at least one measuring unit is arranged to deliver a signal to a control unit which incorporates a computer for compiling and estimating the measuring results and for providing relative information on the measuring results of the vehicle.

11. Apparatus according to claim 1, wherein said at least one measuring unit incorporates a inclinometer for detecting the position of the chassis in the vertical plane with reference to the vertical direction, whereby horizontal and vertical measurements may be employed in the determination of vehicle wheel alignment angles.

12. Apparatus according to claim 11, wherein sensitized marks are provided on the vehicle frame structure for use in frame member and chassis unit measurements.

* * * * *

UNITED STATES PATENT AND TRADEMARK OFFICE
CERTIFICATE OF CORRECTION

PATENT NO.   :   5,852,241
DATED        :   December 22, 1998
INVENTOR(S) :   Sten FAGERDAHL and Lars-Erik SKAGERLUND It is certified that error appears in the above-identified patent and that said Letters Patent is hereby corrected as shown below:

On the title page

The Foreign Application Priority Date [30] should read:

April 20, 1994          [SE] Sweden          9401336-4

Signed and Sealed this

First Day of June, 1999

Attest:

Q. TODD DICKINSON

*Attesting Officer*          *Acting Commissioner of Patents and Trademarks*

UNITED STATES PATENT AND TRADEMARK OFFICE
CERTIFICATE OF CORRECTION

PATENT NO. : 5,852,241
DATED : December 22, 1998
INVENTOR(S) : Fagerdahl, et. al.

It is certified that error appears in the above-identified patent and that said Letters Patent is hereby corrected as shown below:

Title page, item [54] and col. 1, should read --"SYSTEM FOR MEASURING WHEEL ANGLES AND CHASSIS UNITS POSITIONS OF A VEHICLE"--.

Signed and Sealed this

Twenty-fourth Day of August, 1999

Attest:

Q. TODD DICKINSON

*Attesting Officer*  *Acting Commissioner of Patents and Trademarks*